(12) United States Patent
Stoll et al.

(10) Patent No.: US 11,641,141 B2
(45) Date of Patent: May 2, 2023

(54) STATOR OF AN ELECTRIC MACHINE

(71) Applicant: Dr. Ing. h.c. F. Porsche Aktiengesellschaft, Stuttgart (DE)

(72) Inventors: Johannes Stoll, Lorch (DE); Rolf Graef, Kornwestheim (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 198 days.

(21) Appl. No.: 16/882,791

(22) Filed: May 26, 2020

(65) Prior Publication Data
US 2020/0373800 A1 Nov. 26, 2020

(30) Foreign Application Priority Data
May 23, 2019 (DE) .................... 10 2019 113 789.6

(51) Int. Cl.
*H02K 3/24* (2006.01)
*H02K 9/19* (2006.01)
*H02K 3/34* (2006.01)
*H02K 3/30* (2006.01)

(52) U.S. Cl.
CPC .............. *H02K 3/24* (2013.01); *H02K 3/30* (2013.01); *H02K 3/345* (2013.01); *H02K 9/19* (2013.01)

(58) Field of Classification Search
CPC ........ H02K 3/40; H02K 3/48; H02K 15/0018; H02K 3/24; H02K 3/30; H02K 1/165; H02K 3/345; H02K 3/12; H02K 3/38; H02K 15/024; H02K 15/026; H02K 15/10; H02K 15/105; H02K 1/20; H02K 9/19
See application file for complete search history.

(56) References Cited

U.S. PATENT DOCUMENTS

| 4,994,700 | A | | 2/1991 | Bansal et al. | |
| 5,341,561 | A | * | 8/1994 | Schorm | H02K 3/32 310/43 |
| 6,798,105 | B1 | | 9/2004 | Nilson | |
| 8,093,770 | B1 | * | 1/2012 | Berhan | H02K 3/24 310/58 |
| 10,633,774 | B2 | * | 4/2020 | Brown | D04H 1/736 |
| 2014/0117805 | A1 | | 5/2014 | Hagiwara et al. | |
| 2015/0322601 | A1 | | 11/2015 | Brown et al. | |

(Continued)

FOREIGN PATENT DOCUMENTS

| CH | 89866 | 10/1920 |
| CN | 1250967 | 4/2000 |

(Continued)

OTHER PUBLICATIONS

German Search Report dated Dec. 23, 2019.
Chinese Office Action dated Sep. 28, 2022.

*Primary Examiner* — Naishadh N Desai
(74) *Attorney, Agent, or Firm* — Gerald E. Hespos; Michael J. Porco

(57) ABSTRACT

A stator (10) of an electric machine has a stator lamination stack (16) that includes stator laminations. The stator (10) also has at least one stator winding (15) defined by conductor bars (11-14) arranged in slots (17) of the stator lamination stack (16) and fixed in the slots (17) of the stator lamination stack (16) with the aid of a fixing device (22). The fixing device (22) in a slot (17), a nonwoven material (20) which can be saturated with a cooling liquid (28).

2 Claims, 2 Drawing Sheets

(56) References Cited

U.S. PATENT DOCUMENTS

| | | | |
|---|---|---|---|
| 2018/0262073 A1* | 9/2018 | Takagi | B32B 27/08 |
| 2018/0309332 A1 | 10/2018 | Stieger et al. | |
| 2018/0367011 A1* | 12/2018 | Bodla | H02K 15/024 |
| 2020/0204028 A1* | 6/2020 | Mizushima | H02K 15/0081 |
| 2020/0313489 A1* | 10/2020 | Campbell | H02K 3/345 |

FOREIGN PATENT DOCUMENTS

| | | |
|---|---|---|
| CN | 2686190 | 3/2005 |
| DE | 1 816 283 | 6/1970 |
| DE | 24 24 831 | 11/1975 |
| DE | 32 41 410 | 12/1983 |
| DE | 10 2015 216 840 | 3/2017 |
| EP | 0 489 882 | 9/1994 |
| JP | 2004040892 | 2/2004 |
| JP | 2006094622 | 4/2006 |
| JP | 2006180611 | 7/2006 |
| JP | 2009199840 | 9/2009 |
| WO | 2014/088900 | 6/2014 |

* cited by examiner

STATOR OF AN ELECTRIC MACHINE

CROSS REFERENCE TO RELATED APPLICATION

This application claims priority under 35 USC 119 to German Patent Appl. No. 10 2019 113 789.6 filed on May 23, 2019, the entire disclosure of which is incorporated herein by reference.

BACKGROUND

Field of the Invention

The invention relates to a stator of an electric machine, having a stator lamination stack with stator laminations and at least one stator winding that comprises conductor bars arranged in slots of the stator lamination stack and fixed in the slots of the stator lamination stack with the aid of a fixing device. The invention further relates to a method for producing a stator and to a method for cooling a stator winding of a stator.

Related Art

WO 2014/088900 A1 discloses a stator of an electric machine where the stator has a stator main body and at least one winding. The conductors of the winding are arranged in slots of the main body. A slot base installation produced from a first fabric, a film and a second fabric are arranged in the slots.

U.S. Pat. No. 6,798,105 B1 discloses a stator of an electric machine where the stator has a stator main body and at least one winding. The conductors of the winding are arranged in slots of the main body, and the conductors are joined together, for example, in a plaited manner.

U.S. Pat. No. 4,994,700 discloses a dynamoelectric machine having a stator with a stator main body and at least one winding. The winding has conductor bars arranged in slots of the main body and fixed in the slots by in each case one spring element that surrounds the conductor bars and has a wave-like cross section.

DE 18 16 283 discloses a device for fixing the winding bars or coils in the slots of the iron body of an electric machine. The slot is closed off by at least one closure piece extending over at least a portion of the iron length. The space of the slot between the slot closure piece and the slot base that is not filled by the winding is filled by a tubular hollow body that consists of an elastic and magnetic material and in whose interior a specific controllable pressure is generated continuously by a pressure-generating system connected to one of its ends, such that a specific radial pressure is exerted continuously on the bars or coil of the winding.

DE 32 41 410 A1 discloses a device for fixing the windings of electric machines. The windings consist of individual coils that are inserted into stator slots. Each slot has a closure formed from a slot closure wedge, a spring element and a spring support.

EP 0 489 882 B1 discloses a method for producing the electrical insulation of the winding of an electric machine, which has winding sections inserted with play into slots of the rotor or stator. A laminate that expands under heat and that contains an elastically compressible mass of highly elastic fibers is introduced between the slot surface and the winding sections.

DE 10 2015 216 840 A1 discloses a stator for an electric machine. The stator has a lamination stack with slots that extend in an axial direction of the stator. Electrically conductive bars constitute electrical windings of the stator and are arranged respectively in the slots. Each bar is insulated electrically with respect to the lamination stack by a respective electrical insulation element. The electrical insulation element is a hose formed from a thermoplastic and surrounds the bar.

It is an object of the invention to improve a stator, in particular with regard to the service life thereof and/or to the producibility thereof.

SUMMARY

The invention relates to a stator of an electric machine. The stator has a stator lamination stack that comprises stator laminations. The stator also has at least one stator winding that comprises conductor bars arranged in slots of the stator lamination stack and fixed in the slots of the stator lamination stack with the aid of a fixing device. The fixing device in a slot comprises a nonwoven material that can be saturated with a cooling liquid. The nonwoven material functions as slot base insulation. This provides the advantage that an impregnation of the stator winding can be omitted.

The nonwoven material may comprise a volume that increases with absorption of the cooling liquid such that the conductor bars are fixed in the slot by the nonwoven material saturated with the cooling liquid. This provides the advantage that additional fixing elements for fixing the connected bars in the slots of the stator lamination stack can be omitted.

The nonwoven material may surround the conductor bars in the slot. The conductor bars are for example simply wound with the nonwoven material, and end portions of the nonwoven material may be arranged in an overlapping manner.

The slot may be lined with the nonwoven material. The desired functionality of the nonwoven material can thus be realized in a simple manner.

A pressure difference acts on the nonwoven material saturated with the cooling liquid. The pressure difference has the effect that the conductor bars fixed by the saturated nonwoven material are surrounded by cooling liquid. Direct cooling of the windings is thus made possible in a simple manner.

The invention also relates to a method that includes encasing conductor bars of a stator with a nonwoven material. For example, end portions of the nonwoven material may be crossed one over the other.

The method also may include lining the slot with the nonwoven material.

The method also may include saturating the nonwoven material in the slot with the cooling liquid so that the conductor bars are fixed in the slot by the saturated nonwoven material.

A method for cooling a stator winding of a stator may include applying a pressure difference to the nonwoven material saturated with the cooling liquid to cool the conductor bars directly with the cooling liquid. Thus, the nonwoven material advantageously performs two function, namely fixing the conductor bars in a stable manner in the slot and also direct cooling of the conductor bars in the slot.

The invention further relates to a nonwoven material for a stator as described above. The nonwoven material is able to be handled separately. The nonwoven material may comprise melt blown filaments, spun bound filaments or a combination of melt blown filaments and spun bound filaments. The nonwoven material also may comprise particulates, such as inorganic particulates. The filaments and/or the particulates may comprise superabsorbent polymers (SAP). At least one of the filaments of the nonwoven material may be polypropylene filaments. However, the filaments and/or fibers may alternatively or additionally include filaments and/or fibers made from polyolefins, polyethylene and/or polyesters. Other nonwoven materials are disclosed, for example, in U.S. Pat. No. 10,633,774. Examples of absorbent nonwoven materials are sold by Technical Absorbents Ltd. of Grimsby, UK under the trademark SAF.

Further advantages, features and details of the invention will emerge from the description below in which various exemplary embodiments are described in detail with reference to the drawing.

DETAILED DESCRIPTION

Figure 1:
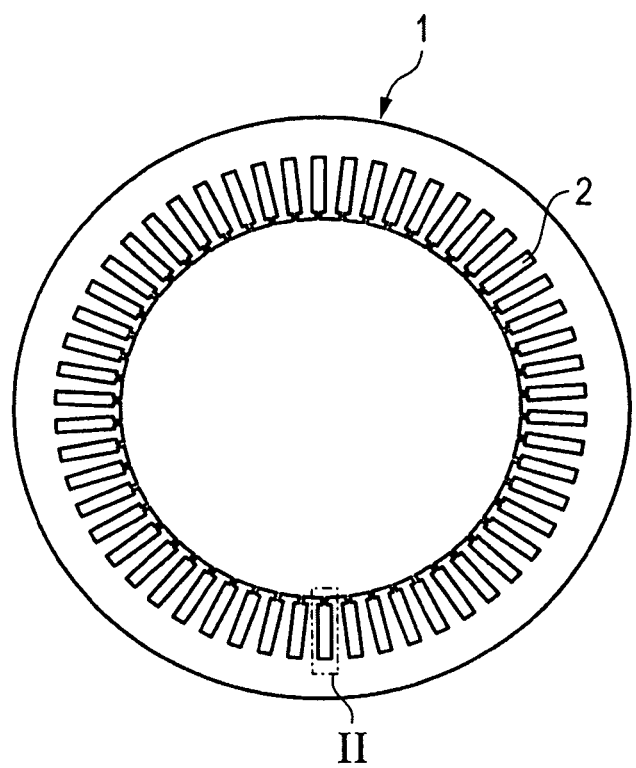
FIG. 1 is a plan view a conventional stator lamination with multiple slots.
Figure 2:
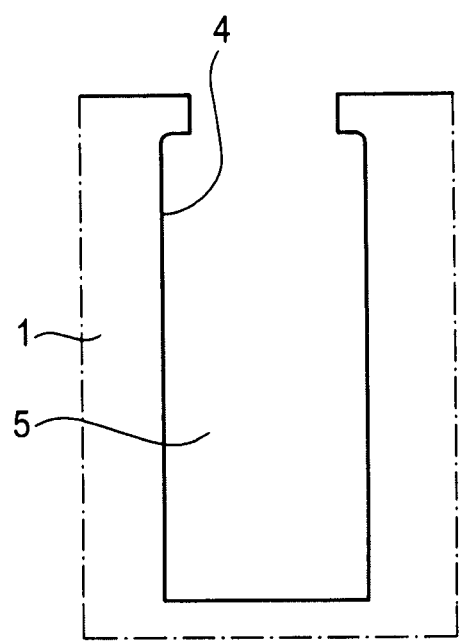
FIG. 2 is an enlarged illustration of detail II of FIG. 1 with one slot.

FIG. 1 is a plan view of a classic stator lamination 1 with a total of fifty-four slots 2. FIG. 2 is an enlarged detail II from FIG. 1 with a slot 5. The slot 5 has a substantially rectangular geometry 4 that is open toward the top in FIG. 2.

Figure 3:
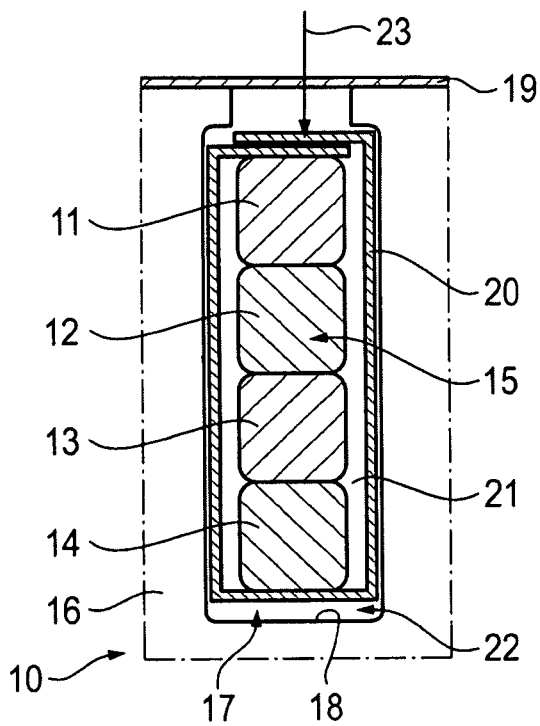
FIG. 3 shows a slot as illustrated in FIG. 2 with a stator winding surrounded by a nonwoven material saturated with a cooling liquid.

FIG. 3 illustrates a stator 10, with conductor bars 11 to 14 of a stator winding 15, in simplified form. The stator winding 15 is arranged in a slot 17 of a stator lamination stack 16. A slot base 18 of the slot 17 is arranged at the bottom in FIG. 3. The top of the slot 17 in FIG. 3 is closed off by a stator seal 19.

A nonwoven material 20 is arranged in the slot 17 in an intermediate space 21 between the conductor bars 11 to 14 and the stator lamination stack 16. The nonwoven material 20 completely surrounds the conductor bars 11 to 14 of the stator winding 15. End portions of the nonwoven material 20 are crossed one over the other in FIG. 3.

The nonwoven material 20 functions as a fixing device 22 for fixing the conductor bars 11 to 14 of the stator winding 15 in the slot 17. To activate the fixing device 22, the nonwoven material 20 is saturated with a cooling liquid, as indicated in FIG. 3 by an arrow 23.

The cooling liquid is for example a conventional cooling liquid such as is used for the direct cooling of stator windings. The feed of the cooling liquid has the effect that the nonwoven material 20 in the slot 17 expands, until the intermediate space 21 is filled completely with the nonwoven material 20.

Figure 4:
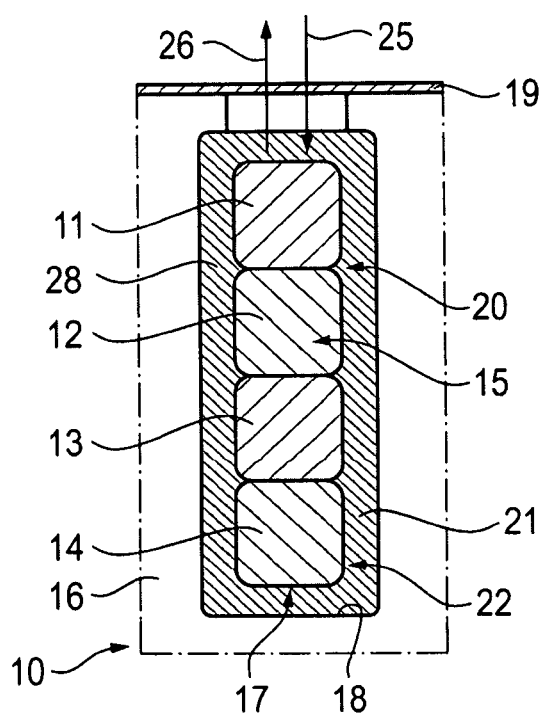
FIG. 4 shows the slot of FIG. 3, with a pressure difference being applied to the nonwoven material saturated with the cooling liquid to directly cool the stator winding in the slot.

It can be seen in FIG. 4 that the conductor bars 11 to 14 of the stator winding 15 are fixed in a stable manner in the slot 17 by the nonwoven material 20 saturated with cooling liquid 28. Furthermore, in FIG. 4, arrows 25 and 26 are used to indicate that a pressure difference is applied to the nonwoven material 20 saturated with the cooling liquid 28 to cool the conductor bars 11 to 14 of the stator winding 15 in the slot 17 directly with the cooling liquid 28.

REFERENCE DESIGNATIONS

1 Stator lamination
2 Slot
4 Geometry
5 Slot
10 Stator
11 Conductor bar
12 Conductor bar
13 Conductor bar
14 Conductor bar
15 Stator winding
16 Stator lamination stack
17 Slot
18 Slot base
19 Stator seal
20 Nonwoven material
21 Intermediate space
22 Fixing device
23 Arrow
25 Arrow
26 Arrow
28 Cooling liquid

What is claimed is:

1. A method for producing a stator, comprising: providing a stator lamination stack having stator laminations formed with slots, each of the slots having an open slot entry, a closed slot base and opposed side surfaces extending between the slot entry and the slot base, the slot entry defining a narrower dimension than a distance between the opposed side surfaces; lining the slots with a specified nonwoven material so that the specified nonwoven material is adjacent the closed slot base and the side surfaces, the specified nonwoven material increasing in volume when saturated with a specified cooling liquid; arranging conductor bars in the slots of the stator lamination stack so that each of the conductor bars faces toward the specified nonwoven material that is adjacent the side surfaces of the slots; crossing end portions of the specified nonwoven material over one another and over the conductor bars at positions between the conductor bars and the open slot entry and inward of the open slot entry, thereby encasing the conductor bars with the specified nonwoven material that increases in volume when saturated with a specified cooling liquid; and placing the slots in communication with the specified cooling liquid and thereby causing the nonwoven material to be saturated by the cooling liquid and to increase in volume sufficiently to fix the conductor bars in the slots.

2. The method claim 1, further comprising: applying a pressure difference to the nonwoven material saturated with the cooling liquid to cool the conductor bars directly with the cooling liquid.

* * * * *